US008768621B2

(12) United States Patent
Ruizenaar

(10) Patent No.: US 8,768,621 B2
(45) Date of Patent: Jul. 1, 2014

(54) SIGNAL PROCESSING MODULE, NAVIGATION DEVICE WITH THE SIGNAL PROCESSING MODULE, VEHICLE PROVIDED WITH A NAVIGATION DEVICE AND METHOD OF PROVIDING NAVIGATION DATA

(75) Inventor: Marcel Gregorius Anthonius Ruizenaar, Zoetermeer (NL)

(73) Assignee: Nederlandse Organisatie voor toegepast—natuurwetenschappelijk onderzoek TNO, Delft (NL)

( * ) Notice: Subject to any disclaimer, the term of this patent is extended or adjusted under 35 U.S.C. 154(b) by 449 days.

(21) Appl. No.: 13/130,977

(22) PCT Filed: Nov. 26, 2009

(86) PCT No.: PCT/NL2009/050719
§ 371 (c)(1),
(2), (4) Date: Jul. 25, 2011

(87) PCT Pub. No.: WO2010/062176
PCT Pub. Date: Jun. 3, 2010

(65) Prior Publication Data
US 2011/0276262 A1    Nov. 10, 2011

(30) Foreign Application Priority Data

Nov. 26, 2008  (EP) .................................... 08170000

(51) Int. Cl.
*G01C 21/16* (2006.01)
(52) U.S. Cl.
USPC ........... 701/511; 701/512; 701/518; 701/505; 702/141; 73/1.38; 73/503.3; 73/514.01
(58) Field of Classification Search
USPC ...................... 701/23, 27, 400, 408, 468–469, 701/472–473, 489, 500–501, 505, 507, 701/511–512, 518; 702/141; 73/1.37, 1.38, 73/488, 503, 503.3, 514.01, 514.02
See application file for complete search history.

(56) References Cited

U.S. PATENT DOCUMENTS 3,509,765 A * 5/1970 Berg et al. .................... 73/178 R
5,970,779 A  10/1999 Shonting et al.
(Continued)

FOREIGN PATENT DOCUMENTS

GB    1135117    11/1968
WO    02059627   8/2002

OTHER PUBLICATIONS

Kohler, Stewart M. "XP002573870—MEMS Inertial Sensors with Integral Rotation Means" Sandia Report, issued by Sandia National Laboratories, (Sep. 2003): Print.

(Continued)

*Primary Examiner* — Thomas Black
*Assistant Examiner* — Ce Li
(74) *Attorney, Agent, or Firm* — Waddey & Patterson, P.C.; James R. Cartiglia

(57) ABSTRACT

A signal processing module (50) comprises a difference signal generating module (60) for generating at least one difference signal (Δ) from a first and a second acceleration measurement vector signal (S1, S2), the first and the second acceleration measurement vector signal (S1, S2) respectively comprising a first and a second sequence of vector signal samples, the vector signal samples comprising at least a first and a second linearly independent acceleration measurement signal component, wherein the vector signal samples represent a measurement result of an acceleration sensor having a variable orientation as a function of time, wherein samples in the first sequence have a corresponding sample in the second sequence. The signal processing module (50) further comprises an inverse calculation module (70) with a matrix inversion facility (71) for providing inverted matrix data (M−1) by inverting a matrix derived from at least one angle of rotation signal, matrix (M) being indicative for a difference in orientation at which the sample of the first sequence and the corresponding sample of the second sequence were obtained, and with a matrix multiplication facility (72) for estimating from the at least one difference signal and the inverted matrix data a bias signal (b1, b2) and/or an object state signal corrected for bias.

20 Claims, 11 Drawing Sheets

(56) References Cited

U.S. PATENT DOCUMENTS

| | | | |
|---|---|---|---|
| 7,066,004 B1 * | 6/2006 | Kohler et al. | 73/1.38 |
| 7,103,477 B1 | 9/2006 | Lee | |
| 2002/0099481 A1 * | 7/2002 | Mori | 701/23 |

OTHER PUBLICATIONS

PCT/NL2009/050719 International Search Report, mailed Mar. 31, 2010.

* cited by examiner

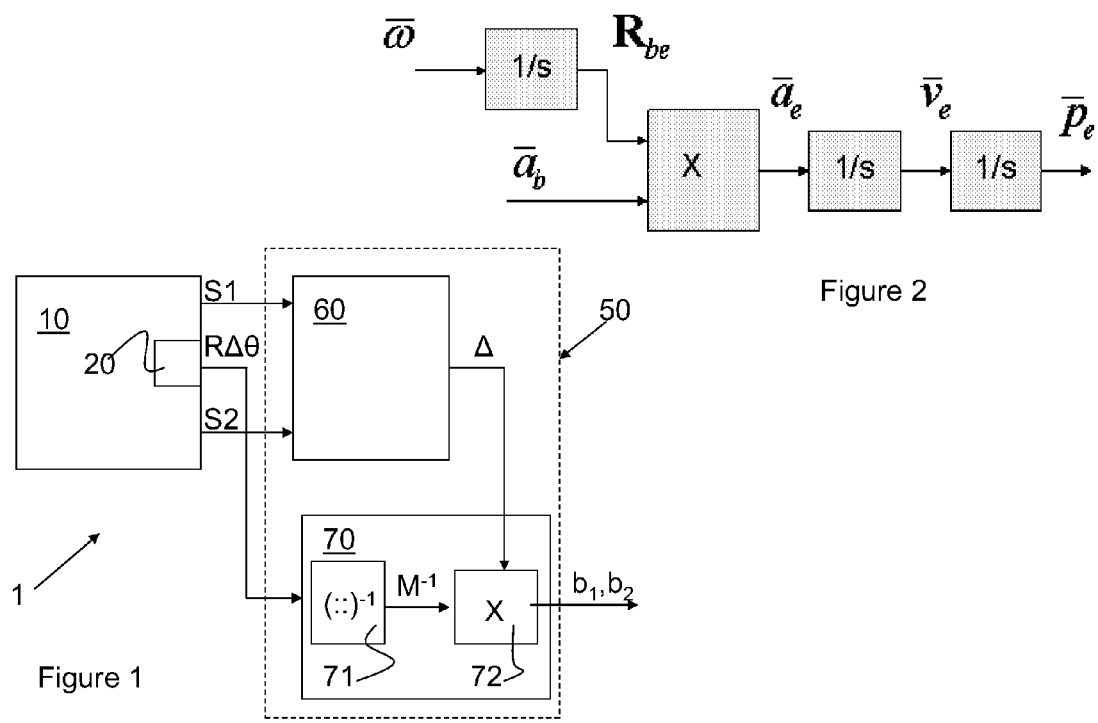

Figuur 4

SIGNAL PROCESSING MODULE, NAVIGATION DEVICE WITH THE SIGNAL PROCESSING MODULE, VEHICLE PROVIDED WITH A NAVIGATION DEVICE AND METHOD OF PROVIDING NAVIGATION DATA

BACKGROUND OF THE INVENTION

1. Field of the Invention

The present invention relates to a signal processing module.

The present invention further relates to a navigation device provided with a signal processing module.

The present invention further relates to a vehicle provided with a navigation device.

The present invention further relates to a method of providing navigation data.

2. Related Art

Nowadays GPS navigation facilities are available that can relatively accurately determine a position of a vehicle. However, in some circumstances alternative navigation methods are required as GPS-navigation signals are not always available, for example at locations below sea level and in buildings. One such alternative method is based on data obtained from inertial sensors. Inertial sensors comprise gyroscopes and accelerometers. Gyroscopes provide information about the orientation of the vehicle and accelerometers provide information about its acceleration. If the initial position and velocity of a vehicle are known, its momentaneous velocity and position can be estimated by numerical integration of the acceleration and orientation data obtained from the accelerometers and gyroscopes. Generally accelerometers have a systematic error, also denoted as bias, resulting in a drift in position indication, exponential in time. Accordingly, such navigation systems based on inertial sensors need to be calibrated periodically to measure and compensate the sensor biases. With low-cost sensors, and without bias compensation, the navigation solution becomes useless within minutes.

A method to calculate a bias and a sensor signal compensated for bias is known as indexing. This method involves measuring acceleration at predetermined orientations, e.g. 0 and 180° of the acceleration sensor and calculating the bias from the sum of the measurement results. The estimation of the bias obtained in this way can be used to correct the measurement result. This has the disadvantage that the acceleration measurement has to be periodically interrupted for calibration. Alternatively a bias compensated acceleration signal may be obtained by subtraction of the measurement results. This has the disadvantage that it is necessary to wait until the sensor has rotated over 180 degrees before a new bias compensated acceleration signal sample is available.

U.S. Pat. No. 7,212,944 describes a method for determining bias comprising a plurality of sensors. Sequentially a different sensor is rotated, while the outputs of the other sensors are used to perform inertial calculations continuously through time. As each of the acceleration sensors is rotated from time to time, the effect of bias is averaged out. Although this allows for a continuous measurement of the acceleration, a relatively complex control of the acceleration sensors is required for sequentially rotating one of the sensors and for selecting the other sensors for determining the acceleration signal.

Accordingly there is a need for a more simple device and method to determine bias and/or to provide for a bias free estimation of the acceleration.

SUMMARY OF THE INVENTION

According to a first aspect of the invention, a signal processing module is provided as claimed in claim 1.

According to a second aspect of the invention, a navigation device is provided as claimed in claim 2.

According to a third aspect of the invention, a method is provided as claimed in claim 12.

Furthermore, according to a fourth aspect of the invention, a vehicle as claimed in claim 10 is provided.

According to the invention a first and a second acceleration measurement vector signal are provided that respectively comprise a first and a second sequence of vector signal samples. The vector signal samples comprise at least a first and a second linearly independent acceleration measurement signal component. These signal components are preferably obtained by measurement of the acceleration along mutually orthogonal axes, but alternatively said axes may have a relative orientation of an angle differing from 90°, for example in a range of 20° to 160°.

An angle of rotation signal is provided that is indicative for the difference in orientation at which the sample of the first sequence and the corresponding sample of the second sequence were obtained.

At least one difference signal is generated from the first and the second acceleration measurement vector signal, inverted matrix data is provided by inverting a matrix derived from the angle of rotation difference signal and subsequently a bias signal and/or an object state signal corrected for bias is estimated from the at least one difference signal and the inverted matrix data. The first and the second acceleration measurement vector signal may be subject to further operations before generation of the difference signal.

According to the method and device according to the present invention acceleration measurement samples at different orientations are periodically sampled. Taking into account the difference in orientation at which the sample of the first sequence and the corresponding sample of the second sequence were obtained the contribution of bias to the measured signal samples and an estimation for the bias-compensated signal can be periodically obtained.

It is noted that U.S. Pat. No. 7,066,004 discloses a MEM inertial sensor (e.g. accelerometer, gyroscope) having integral rotational means for providing static and dynamic bias compensation. The described sensor comprises a MEM inertial sense element disposed on a rotatable MEM stage. A MEM actuator drives the rotation of the stage between at least two predetermined rotational positions. Measuring and comparing the output of the MEM inertial sensor in the at least two rotational positions allows, for both static and dynamic bias compensation in inertial calculations based on the sensor's output. The known sensor requires operation in a static mode in order to be able to estimate the bias.

In the signal processing module according to the first aspect of the invention the first and the second acceleration measurement vector signal (S1, S2) respectively comprise a first and a second sequence of vector signal samples that comprise at least a first and a second linearly independent acceleration measurement signal component. The vector signal samples represent a measurement result of an acceleration sensor having a variable orientation as a function of time, wherein samples in the first sequence have a corresponding sample in the second sequence. This feature results in the technical effect that the bias is estimated and/or corrected during normal operation of the device. Accordingly a separate static mode is superfluous.

Likewise the method according to the third aspect of the invention is characterized in that the step of providing the first and the second acceleration measurement vector signal respectively comprises providing a first and a second sequence of vector signal samples that comprise at least a first and a second linearly independent acceleration measurement signal component, and that the angle of rotation signal is indicative for a difference in orientation at which the sample of the first sequence and the corresponding sample of the second sequence were obtained.

In a first embodiment the inertial sensor unit comprises a first and a second inertial sensor that provide the first and the second acceleration measurement vector signal respectively, as well as a rotation facility that causes a relative rotation between the first and the second inertial sensor. The relative rotation may be generated for example in that each of the inertial sensors is independently rotated by a respective actuator at a mutually different rotational speed. Preferably, however, only one of the sensors is rotated, while the other has a fixed orientation. In this embodiment, the device has a difference signal generating module that comprises integration and subtraction facilities. The difference signal generating module is arranged for determining at least a difference between an $n^{th}$ order integrand of the first and the second acceleration measurement vector signal and a difference between an $m^{th}$ order integrand of the first and the second acceleration measurement vector signal wherein m and n are mutually different integers greater or equal than 0. The inverse calculation module comprises integration facilities that derive the matrix from the angle of rotation signal.

Preferably the value for m and n differs by one to minimize the number of integrations. Preferably the values of m and n are 1 and 2 respectively. This implies that a difference in velocity and a difference in position are estimated from the sensor signals. In an alternative embodiment a difference in acceleration and a difference in velocity are estimated from the sensor signals. However, this embodiment is relatively sensitive for the influence of the rotation imposed on the sensor(s). Accordingly a more accurate estimation of bias and the bias compensated acceleration signal is obtained by a selection of the values 1 and 2 for m and n respectively. It is assumed that a higher order integration does not further improve accuracy noticeably.

Instead of using a first and a second inertial sensor in this embodiment, a larger plurality of sensors may be used. In that case the bias and/or the bias compensated acceleration signal may be determined with an improved precision.

The angle of rotation signal, indicative for a difference in orientation at which the sample of the first sequence and the corresponding sample of the second sequence were obtained, may be derived in various ways. For example the relative orientation of the acceleration sensors may be measured by optical encoding means. Alternatively the orientation of each of the sensors may be measured by a respective angular sensor, e.g. a gyroscope with integration means or a compass. Alternatively an actuator that imposes a relative rotation upon the sensors may issue a signal indicative for the momentaneous angle between the first and the second inertial sensor.

In a second embodiment of a navigation device according to the invention the inertial sensor unit comprises a single acceleration sensor for generating a single acceleration measurement vector signal. A signal splitting facility derives the first and the second acceleration measurement vector signals from the single acceleration measurement vector signal, for example by alternately assigning a sample of the single acceleration measurement vector signal as a sample of the first and as a sample of the second acceleration measurement vector signal. The angle of rotation signal of the orientation signal generation unit is indicative for an orientation of the acceleration sensor. The single acceleration sensor may be rotated controllably by an actuator, but may otherwise be passively rotated by movements of a vehicle at which the sensor is mounted or by a combination of both. The angle of rotation signal, indicative for a difference in orientation at which the sample of the first sequence and the corresponding sample of the second sequence were obtained, may be derived in various ways e.g. by a gyroscope with integration means or a compass mechanically coupled to the single acceleration sensor.

In this second embodiment, the navigation device comprises a difference signal generating module with a delay facility for delaying the samples of the first acceleration measurement signal for synchronization with corresponding samples of the second acceleration measurement signal. It further comprises a rotation compensation facility for compensating for a difference in orientation of the acceleration sensor between the moment of sampling a sample for the first acceleration measurement signal vector and the moment of sampling a corresponding second sample for the second acceleration measurement signal vector. The compensation facility is controlled by the angle of rotation signal.

The second embodiment is advantageous in that only a single acceleration sensor is required and in that it is not necessary to actively rotate the single sensor. It is sufficient that naturally occurring rotations, e.g. caused by a vehicle at which the sensor is mounted are present. Signals obtained by a conventional acceleration sensor may be used. This is advantageous in that the invention can be applied to vehicles provided with such a conventional acceleration sensor by processing the acceleration sensor signal with a signal processing module according to the invention. This embodiment is particular suitable if the momentaneous rotation frequency is relatively high in comparison with the bandwidth with which the acceleration sensor is sampled. If the average rotation frequency of naturally occurring rotations is too low the acceleration sensor may still be actively rotated by an additional actuator.

The navigation device may be used as a standalone device, for a fireman may carry the device to navigate within a building obscured by smoke.

The invention relates further to a vehicle provided with a navigation device according to the invention. The vehicle is for example a bicycle, car, motorcycle, train, ship, boat, or aircraft. Preferably the vehicle comprises a drive and steering mechanism controlled by the navigation device. The vehicle may comprise a further navigation facility such as a GPS receiver, or an odometer, for providing information relating to a state of the vehicle, the state comprising at least one of a position, a velocity and an acceleration and an orientation of the vehicle. A combination facility may be present for combining the object-state signal of the navigation device with the information provided by the further navigation facility. The combination facility may for example select the most reliable information for navigation.

It should be noted that the signal processing can be implemented in hardware, software, or a combination of both.

BRIEF DESCRIPTION OF THE DRAWINGS

These and other aspects are described in more detail with reference to the drawing.

Therein:

FIG. 1 schematically shows a navigation device according to the present invention, FIG. 2 schematically shows a relation between various variables.

DETAILED DESCRIPTION OF EMBODIMENTS

Figure 3:
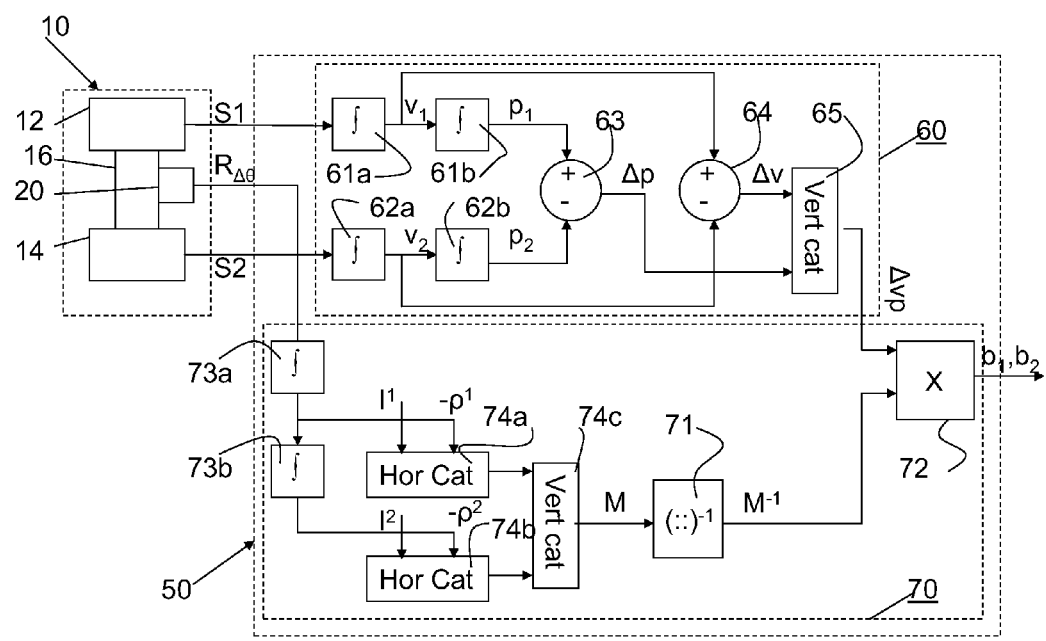
FIG. 3 shows in more detail a first embodiment of a navigation device according to the invention.

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, and/or sections, these elements, components, and/or sections should not be limited by these terms. These terms are only used to distinguish one element, component or section from another element, component, and/or section. Thus, a first element, component, and/or section discussed below could be termed a second element, component, and/or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. All publications, patent applications, patents, and other references mentioned herein are incorporated by reference in their entirety. In case of conflict, the present specification, including definitions, will control. In addition, the materials, methods, and examples are illustrative only and not intended to be limiting.

FIG. 1 schematically shows a navigation device 1 that comprises an inertial sensor unit 10 for providing a first and a second acceleration measurement vector signal S1, S2 and an orientation signal generation unit 20, here embedded in the inertial sensor unit for providing an angle of rotation signal $R_{\Delta\theta}$. The first and the second acceleration measurement vector signal S1, S2 respectively comprise a first and a second sequence of vector signal samples $S1_i$, $S2_i$. The vector signal samples $S1_i$, $S2_i$ comprise at least a first and a second linearly independent acceleration measurement signal component, wherein the vector signal samples represent a measurement result of an acceleration sensor having a variable orientation as a function of time. Samples $S1_i$ in the first sequence have a corresponding sample $S2_i$ in the second sequence. The angle of rotation signal $R_{\Delta\theta}$ is indicative for a difference in orientation at which the sample $S1_i$ of the first sequence and the corresponding sample $S2_i$ of the second sequence were obtained. The apparatus shown in FIG. 1 has a signal processing module 50 for estimating a bias signal b1, b2 and/or an object state signal p, v, a corrected for bias.

The signal processing module 50 comprises a difference signal generating module 60 for generating at least one difference signal Δ from the first and the second acceleration measurement vector signal S1, S2, and an inverse calculation module 70 with a matrix inversion facility 71 for providing inverted matrix data by inverting a matrix derived from the angle of rotation signal $R_{\Delta\theta}$ and a matrix multiplication facility 72 for estimating from the at least one difference signal and the inverted matrix data a bias signal b1, b2 and/or an object state signal corrected for bias. The signal processing module may comprise a filter facility, e.g. low-pass filter facility to eliminate noise from the output signals from the bias signal and or corrected object state signal. The filter facility is preferably applied after the matrix multiplication facility, but alternatively the input signals (Δ, $M^{-1}$) of the matrix multiplication facility may be filtered. Likewise the input signals of the signal processing facility (S1, S2, $R_{\Delta\theta}$) may be filtered for this purpose.

FIG. 2 schematically indicates the relation between signals occurring in a basic inertial measurement system. First, the measured angular velocity $\bar{\omega}$ is numerically integrated yielding the orientation of the vehicle body θ. The orientation θ is used to calculate a so-called rotation matrix $R_{be}$ (usually this integration is done such that it yields directly $R_{be}$). With this matrix, the acceleration vector $\bar{a}_b$, measured with respect to the vehicle body frame axis (indicated with a subscript b), is rotated to an inertial frame. The inertial acceleration vector $\bar{a}_e$ (indicated by a subscript e) is now numerically integrated twice to obtain the velocity $\bar{v}_e$, of the body and the position $\bar{p}_e$, both with respect to an inertial frame.

An embodiment of a navigation device 1 according to the invention is shown in more detail in FIG. 3. In the embodiment shown, the inertial sensor unit 10 comprises a first and a second inertial sensor 12, 14 that provide the first and the second acceleration measurement vector signal S1, S2 respectively. The inertial sensor unit 10 further comprises a rotation facility 16 that causes a relative rotation between the first and the second inertial sensor 12, 14.

Presume that the two inertial sensors are coupled, i.e. are both strapped down to the same body, e.g. a navigation device, e.g arranged within a vehicle body. In order to simplify the mathematical derivation below it is further presumed that one of the inertial sensors is fixed to the body and the other is rotating with respect to the other. However, alternatively both inertial sensors may rotate with respect to the body as long as they rotate relatively to each other. It is further presumed that the size of both inertial sensors is relatively small and are placed near each other such that they can be assumed to travel equal trajectories. So, both sets of accelerometers travel the same trajectory at all times, and only their orientation differs. This means however that the velocity is also identical at all times. Accordingly the following set of equations is applicable:

$$\overline{v}_e^i(T) = \int_{t=0}^{t=T} R_{be}(t) \cdot (\overline{a}_b^t(t) + \overline{b}) \cdot dt \quad [1]$$

$$\overline{v}_e^i(T) = \int_{t=0}^{t=T} R_{be}(t) \cdot \overline{a}_b^t(t) \cdot dt + \overline{b} \int_{t=0}^{t=T} R_{be}(t) \cdot dt \quad [2]$$

Therein the rotation matrix $R_{be}$ corresponds to the orientation $\theta$ of the sensor, $\overline{a}_b^i$ is the actual acceleration experienced by the sensor in the body axis system, and $\overline{b}$ is the bias of the sensor.

The right side of equation [2] consists of two terms. The first term is the evaluation of the true velocity of the acceleration sensor. The integrand of the second term is known at all times and is derived from the gyro measurements. Integration of the integrand results in a known constant matrix $\phi(T)$. The velocity indication $\overline{v}_e^i$ of the INS associated with each sensor can then be further simplified to:

$$\overline{v}_e^i(T) = \overline{v}_e^t(T) + \overline{b} \cdot \phi(T) \quad [3]$$

Likewise the position $\overline{p}_e^i$ can be expressed as $$\overline{p}_e^i(T) = \overline{p}_e^t(T) + \overline{b} \cdot \theta(T) \quad [4]$$

Subtracting equations for two sensors results in the following pair of equations $$\left. \begin{array}{l} \Delta \overline{p} = \overline{b}_1 \cdot \theta_1 - \overline{b}_2 \cdot \theta_2 \\ \Delta \overline{v} = \overline{b}_1 \cdot \varphi_1 - \overline{b}_2 \cdot \varphi_2 \end{array} \right\} \quad [5]$$

In this case separate gyros or other sensors for measuring the orientation of each of the acceleration sensors have to be used to determine the rotation matrix $R_{be1}$, $R_{be2}$ for each of the sensors 12, 14. The rotation matrices $R_{be1}$, $R_{be2}$ must each be integrated to obtain the matrices $\theta_1$, $\theta_2$, $\phi_1$ and $\phi_2$. Subsequently the values for $\overline{b}_1$ and $\overline{b}_2$ can be solved by solving the pair of equations [5].

Since both sensors travel the same trajectory at all times (and therefore their position and velocity are identical at all times), both the difference in position indication $\Delta \overline{p}$ and the difference in velocity reading $\Delta \overline{v}$ of both INS-systems associated with the two accelerometers is determined by their biases $\overline{b}_1$ and $\overline{b}_2$. As in this embodiment the relative orientation between the first and the second sensor is actively controlled it can be guaranteed that the two equations [5] are independent. Accordingly, the biases of the two accelerometers can be solved from these set of equations. Knowing the biases $\overline{b}_1$ and $\overline{b}_2$, the corrected values for the velocity and position can be obtained.

During the trajectory, the accelerometer measurements are mathematically rotated from the body frame to an inertial frame using the orientation information obtained from the gyroscope measurements. Now we have the following two equations for the position reading of both INS-systems.

$$\overline{p}_e^1(T) = \quad [6]$$
$$\int_{\tau=0}^{\tau=T} \int_{t=0}^{t=\tau} R_{be}(t) \cdot \overline{a}_b^t(t) \cdot dt \cdot d\tau + \overline{b} \int_{\tau=0}^{\tau=T} \int_{t=0}^{t=\tau} R_{be}(t) \cdot dt \cdot d\tau$$

$$\overline{p}_e^2(T) = \int_{\tau=0}^{\tau=T} \int_{t=0}^{t=\tau} R_{be}(t) \cdot R_{rb}(t) \cdot \overline{a}_r^t(t) \cdot dt \cdot d\tau +$$
$$\overline{b} \int_{\tau=0}^{\tau=T} \int_{t=0}^{t=\tau} R_{be}(t) \cdot R_{rb}(t) \cdot dt \cdot d\tau$$

$\overline{p}_e^1(T)$ and $\overline{p}_e^2(T)$ are the position readings of both INS systems evaluated at time T. $R_{rb}(t)$ is a time varying rotation matrix associated with the rotation of the second accelerometer relative to the (also rotating) body frame. $\overline{a}_r^t(t)$ is the acceleration measured by the second set of accelerometers in the frame rotating with respect to the body.

As shown in the sequel, no gyros are required if only the bias has to be determined. In that case it is sufficient that the relative rotation between the two accelerometers is known.

Since both sets of accelerometers are strapped down to the same navigation device, they have the same acceleration in the frame of the navigation device and mathematical rotation through $R_{be}$ is not necessary. If the mathematical rotation through $R_{be}$ is omitted, the first part of the right side of the above set of equations has no physical meaning anymore, but still the set of equations is mathematically still identical. Accordingly, the pair [5] of equations can be rewritten to:

$$\left. \begin{array}{l} \Delta \overline{p}^* = \overline{b}_1 \cdot I^2 - \overline{b}_2 \cdot \rho^2 \\ \Delta \overline{v}^* = \overline{b}_1 \cdot I^1 - \overline{b}_2 \cdot \rho^1 \end{array} \right\} \quad [7]$$

In this set of equations, $\Delta \overline{p}^*$ and $\Delta \overline{v}^*$ are the difference in position and velocity readings of both INS systems, the "star" indicating that the rotation through $R_{be}$ is omitted. $I^1$ and $I^2$ represent the single and double integrated identity matrix. $\rho^1$ and $\rho^2$ represent the single and double integration of the time varying $R_{rb}$ matrix. Accordingly, in this specific situation it is not necessary to know the absolute orientation of the accelerometers to determine their bias; a simple relative orientation measurement sensor will suffice. Consequently, errors associated with the gyroscopes have no effect on the accuracy by which the biases can be calculated.

Referring again to FIG. 3, the signal processing facility 50 for carrying out these calculations is now described in more detail. It should be understood that the facility may be implemented in dedicated hardware, but may alternatively be implemented by a suitably programmed general purpose processor for example, or a combination of both.

The difference signal generating module 60 comprises integration facilities 61a, 61b, 62a, 62b and subtraction facilities 63, 64. The difference signal generating module 60 is arranged for determining at least a difference between an $n^{th}$ order integrand of the first and the second acceleration measurement vector signal and a difference between an $m^{th}$ order integrand of the first and the second acceleration measurement vector signal wherein m and n are mutually different integers greater or equal than 0.

In this case integration facilities 61a, 62a respectively calculate a velocity vector signal v1, v2 from the sensor signals S1, S2. The integration facilities 61b, 62b respectively calculate a position vector signal p1, p2, from the velocity vector signals v1, v2 respectively. Subtraction facility 64 calculates a difference $\Delta v$ between the velocities that were obtained by single integration from the sensor signals S1, S2. Subtraction facility 63 calculates a difference $\Delta p$ between the positions that were obtained by double integration from the sensor signals S1, S2. As indicated by equation [7] both differences $\Delta p$, $\Delta v$ are only dependent on the bias b1, b2 of the sensors 12, 14. The difference vectors $$\Delta p = \begin{pmatrix} \Delta p_1 \\ \Delta p_2 \end{pmatrix}, \Delta v = \begin{pmatrix} \Delta v_1 \\ \Delta v_2 \end{pmatrix}$$

are concatenated by vertical catenation unit 65 into a vector $$\Delta vp = \begin{pmatrix} \Delta v_1 \\ \Delta v_2 \\ \Delta p_1 \\ \Delta p_2 \end{pmatrix}.$$

The inverse calculation module 70 determines the biases b1, b2 of the sensors 12, 14 by inverse calculation. The inverse calculation module 70 comprises a matrix integration facility 73a, 73b, for integrating the matrix $\rho$ representative for the difference in orientation $R_{\Delta\theta}$ between the sensors 12, 14. Likewise the unity matrix is integrated to obtain its first and second order integrand $I^1$ and $I^2$ respectively. The results are concatenated by horizontal concatenation units 74a, 74b and vertical concatenation unit 74c into a matrix M having the form:

$$\begin{pmatrix} I^1 - \rho^1 \\ I^2 - \rho^2 \end{pmatrix} = \begin{pmatrix} I^1_{11} & 0 & -\rho^1_{11} & -\rho^1_{12} \\ 0 & I^1_{22} & -\rho^1_{21} & -\rho^1_{22} \\ I^2_{11} & 0 & -\rho^2_{11} & -\rho^2_{12} \\ 0 & I^2_{22} & -\rho^2_{21} & -\rho^2_{22} \end{pmatrix}$$

The matrix M is indicative for a difference in orientation at which the sample of the first sequence S1 and the corresponding sample S2 of the second sequence were obtained.

The result is inverted into matrix $M^{-1}$ by matrix inversion unit 71. From the concatenation $\Delta vp$ of the difference signals $\Delta v$, $\Delta p$ and the inverted matrix $M^{-1}$ a bias signal b1, b2 and/or an object state signal corrected for bias is calculated.

The embodiment of FIG. 3 was simulated. In this simulation a continuous rotation of the second accelerometer 14 was presumed of 1.8 degrees/second. Further more noise of 100 $\mu g/\sqrt{Hz}$ (achievable for MEMS accelerometers) has been added to the accelerometer output. Additionally, a set of biases in the order of 1 mg was applied to the accelerometer outputs. The bandwidth of the accelerometers was 100 Hz.

Figure 4:
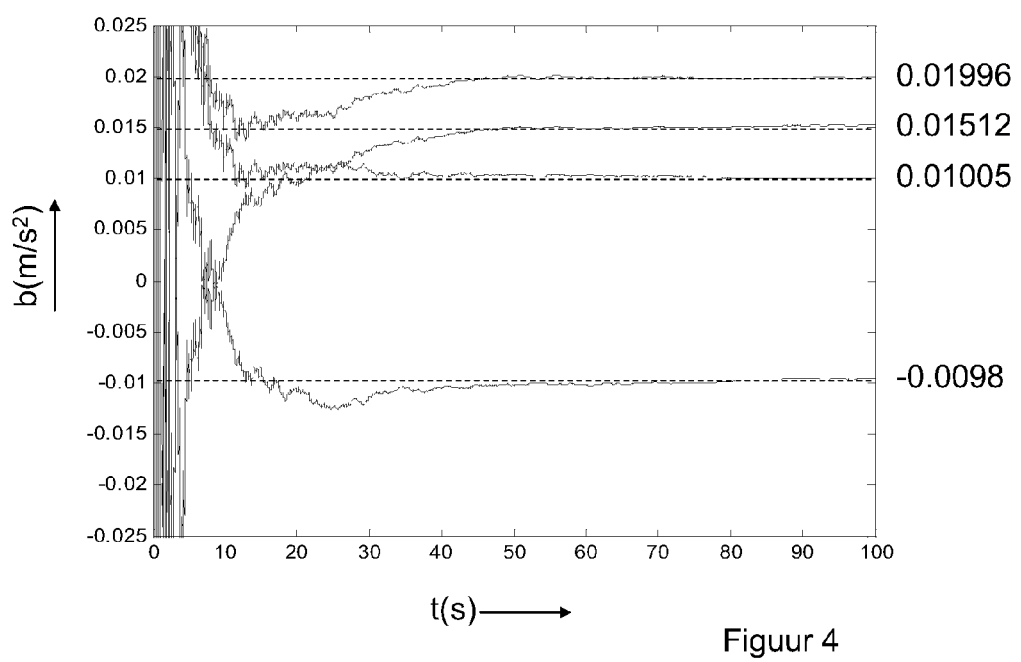
FIG. 4 shows results of a simulation of the first embodiment.

FIG. 4 shows the estimated biases as a function of time. As confirmed by the results of the simulations, shown in FIG. 4, the bias can be accurately estimated semi-continuously. The true biases, including noise effects, were: (from top to bottom) 0.01996, 0.01512, 0.01005, −0.009894 m/s².

In the embodiment described with reference to FIG. 3, the parameters n,m used for calculating a difference between an $n^{th}$ order integrand of the first and the second acceleration measurement vector signal and a difference between an $m^{th}$ order integrand of the first and the second acceleration measurement vector signal are 1 and 2 respectively. For the principle of the invention the value of these parameters n,m is not relevant provided that m and n are mutually different integers greater or equal than 0.

Figure 5:
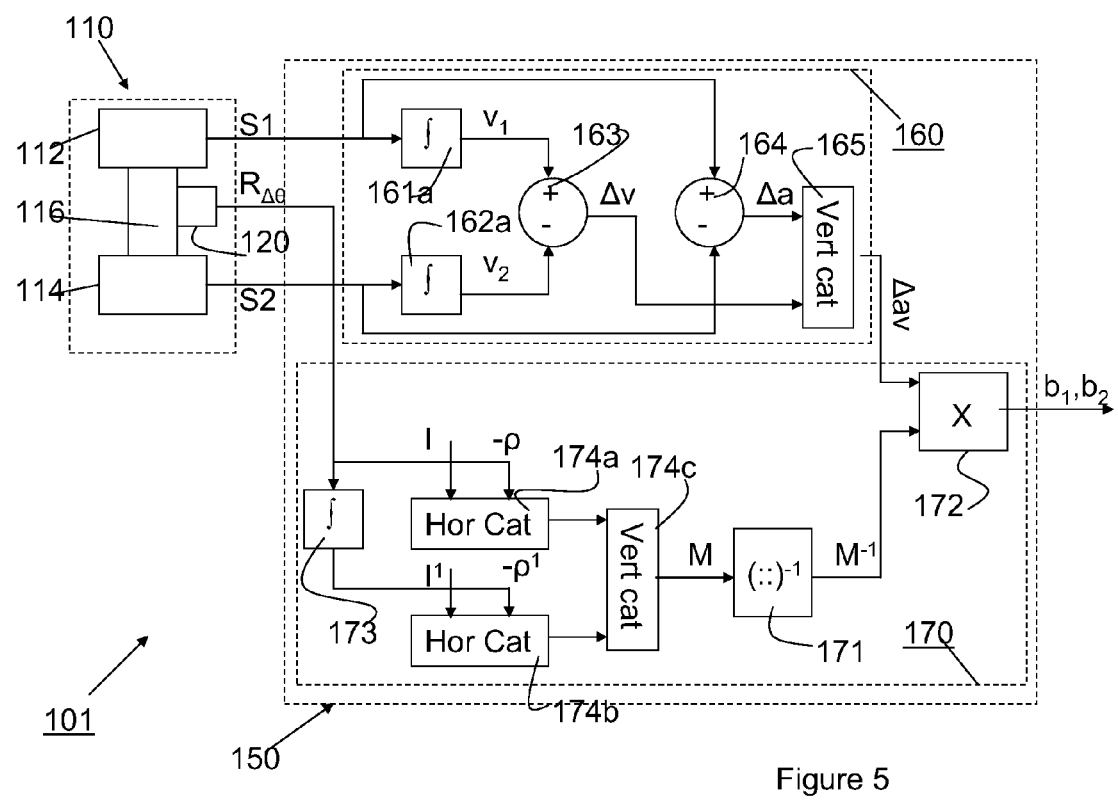
FIG. 5 shows in more detail a second embodiment of a navigation device according to the invention.

For example FIG. 5 shows an alternative embodiment, wherein the parameters m and n are 0 and 1 respectively. In FIG. 5 parts corresponding to those in FIG. 3 have a reference number that is 100 higher. The difference signals used to determine the bias of the acceleration sensors 112, 114 are an acceleration difference signal $\Delta a$, indicative for a difference in acceleration measured by the sensors and a velocity difference signal $\Delta v$ indicative for a difference in velocity estimated by integration of the acceleration signals of each of the sensors 112, 114. Although also in this embodiment the bias can be determined it is more important that the two sensors are accurately positioned relative to each other. I.e. the sensors should substantially have the same position in the coordinate system sensed by the sensors. I.e. if the sensors sense the x-y plane, then the centre of mass of the sensors should have the same x-y coordinates. The sensors may differ in z-position provided that the navigation device is usually not subject to rotations around other axes that the z-axis, for example with application in cars.

Alternatively the higher numbers for the parameters m,n may be selected, but it is suspected that this does not lead to further improvement, while it requires more processing steps.

Figure 6:
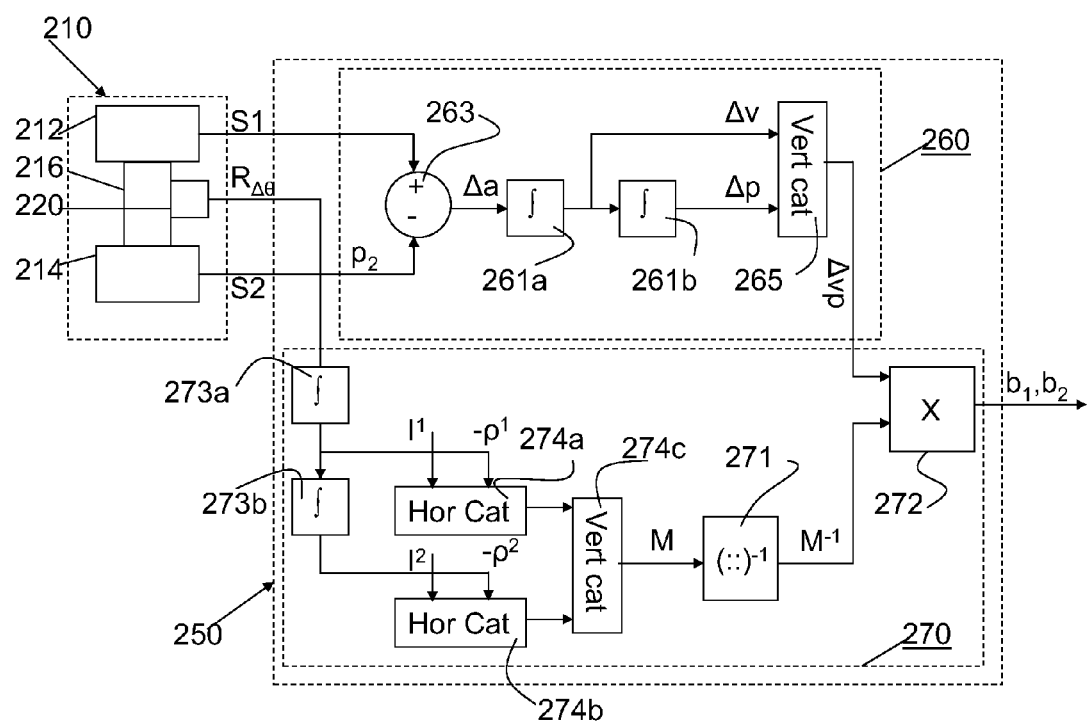
FIG. 6 shows in more detail a third embodiment of a navigation device according to the invention.

FIG. 6 shows a further embodiment. Parts therein corresponding to those in FIG. 3 have a reference number that is 200 higher. In this embodiment the difference signal generating module 260 differs from the one shown in FIG. 3 in that first a difference signal $\Delta a$ is calculated from the acceleration measurement signals S1, S2 and that subsequently the first order and the second order integrand $\Delta v$, $\Delta p$ respectively, of this difference signal are obtained. These difference signals $\Delta v$, $\Delta p$ are equivalent to the difference signals $\Delta v$, $\Delta p$ obtained by the embodiment of FIG. 3 and are used in the same way to estimate the bias b1, b2 of the acceleration sensors 212, 214.

It is not necessary that the first and second acceleration measurement vector signal S1, S2 are provided by respective acceleration sensors. Embodiments having a single acceleration sensor are elucidated below by a theoretical framework followed by practical examples.

Consider a 2D-sensor that may rotate physically with respect to the vehicle body. The output of the double axis accelerometer is spectrally limited with a filter, as with almost all physical sampled systems. This is done to avoid the so-called aliasing effect. In general, the spectral output of a physical system must be limited to $F_s/2$ before it may be sampled with a sampling frequency of $F_s$. Now the output of the filtered accelerometer may be approximated as:

$$\bar{a}_r^i(t) = \bar{a}_b^t(t) \cdot R_{br} + \bar{b}_r + \bar{n}(t) \qquad [8]$$

In which other error terms are neglected for simplicity. $\bar{a}_r^i(t)$ is the measured acceleration, expressed in the axis reference system co-rotating with the accelerometer. The subscript r is used to denote this rotating axis system. $\bar{a}_b^t(t)$ is the true acceleration in the body reference system. $\bar{b}_r$ is the constant bias on the output of the accelerometers and $\bar{n}(t)$ is the measurement noise vector, both expressed in the axis system co-rotating with the accelerometer. $R_{br}$ is the rotation matrix associated with the rotation of the accelerometer with respect to the vehicle body. It is used to mathematically rotate the true acceleration in the body reference system to the rotating reference system and vice versa.

Figure 7:
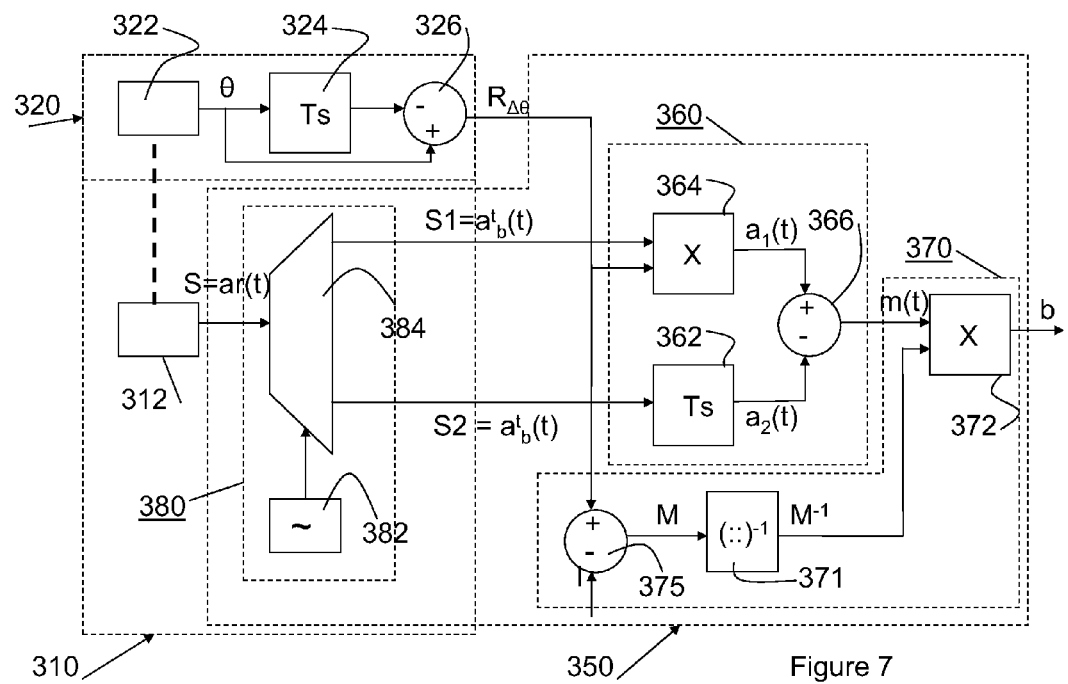
FIG. 7 shows in more detail a fourth embodiment of a navigation device according to the invention.
Figure 8:
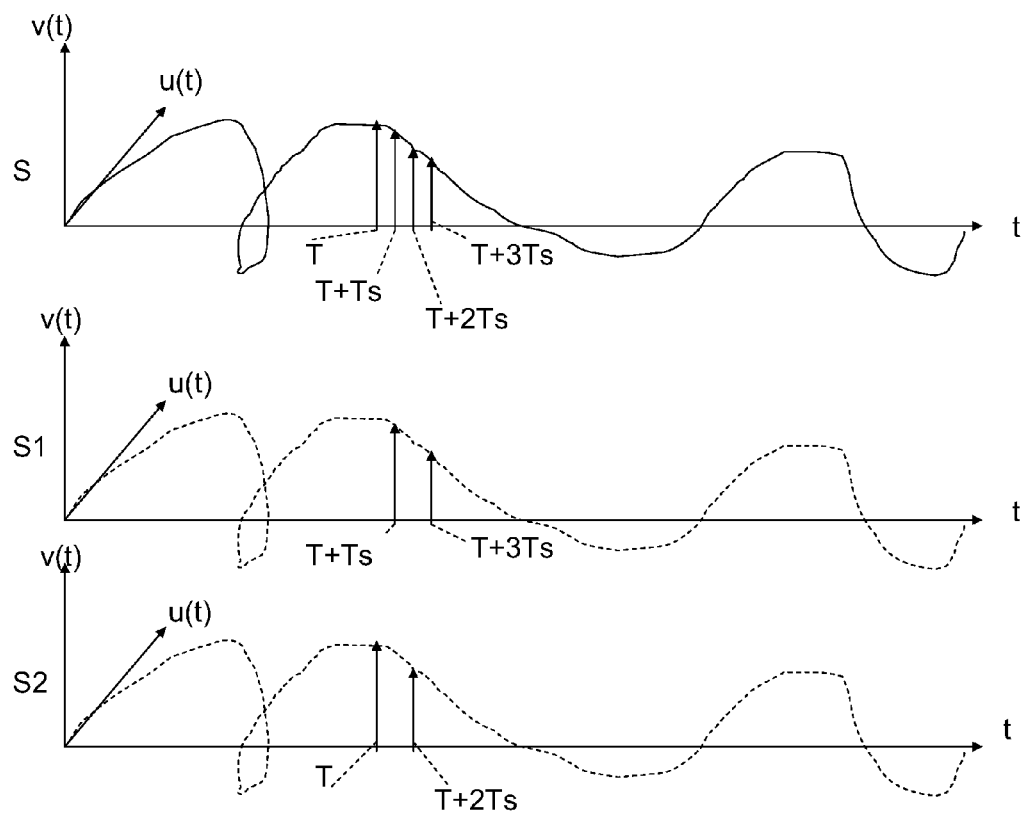
FIG. 8 illustrates various signals relevant for the fourth embodiment of a navigation device according to the invention.

To properly sample the output of the accelerometers, a sampling frequency of at least $F_s$ must be used. Obviously, higher sampling frequencies will do too. Now suppose that a sampling frequency of $2*F_s$, is used and that the stream of samples is split into a stream of odd numbered samples S1 and a stream of even numbered samples S2, as indicated in FIG. 7. In this figure, $a_r(t)$ is the original signal at the filtered output of the accelerometer, sampled at twice the sampling frequency. The stream S of samples $a_r(t)$ is split by a demultiplexing facility 380 into a sequence S1 of odd numbered samples sampled at T+Ts, T+3Ts, . . . and a sequence S2 of even numbered samples, sampled at T, T+2Ts, . . . as illustrated in FIG. 8. Although the sampling frequency of both streams is only half the original sampling frequency of $2*F_s$, it is still sufficient to express the harmonic content of the original signal. Accordingly the two time discrete signals are substantially harmonically identical to the original. Now delay element 362 introduces a small delay over $T_s$ in one of the streams (to synchronise both sample-streams), with $T_s=1/F_s$. During this small delay, the true acceleration signal in the rotating reference frame is physically rotated over a small angle of $\Delta\theta=\omega \cdot T_s$, with $\omega$ the rotation speed. As a rough approximation, the effect of such a delay can be compensated by mathematically rotating the signal back over an angle of $\Delta\theta$, or in this case equivalently, by rotating forward the non-delayed signal the same amount with rotation element 364. The bias on the signals however, is not influenced by physical rotation nor by time delays. So, both streams, after processing can be represented as:

$$a_1(t)=a_b{}^t(t) \cdot R_{rb}(t) \cdot R_{\Delta\theta}+\bar{b} \cdot R_{\Delta\theta}+\bar{n} \cdot R_{\Delta\theta}$$

$$a_2(t)=a_b{}^t(t-T_s) \cdot R_{rb}(t-T_s)+\bar{b}+\bar{n} \qquad [9]$$

In these expressions, $R_{\Delta\theta}$ is a rotation matrix associated with the rotation over $\Delta\theta$. The rotation matrix $R_{\Delta\theta}$ is provided by orientation signal generation unit 320. This unit 320 comprises an angle of rotation sensor 322 that provides an indication $\theta(t)$ for the momentaneous orientation of the sensor 312 at the time t of sampling the acceleration. The angle of rotation sensor 322 may comprise a gyroscope and an integrator, but may alternatively be another type of orientation sensor (e.g, a compass that estimates the orientation from the earth magnetic field). Subtraction element 326 subtracts a delayed sample $\theta(t-Ts)$ of the orientation indication from the sample $\theta(t)$. The delayed sample is obtained from delay element 324. Subtraction element 326 provides the rotation matrix associated with the rotation over $\Delta\theta$.

Now, if $a_b{}^t(t)$ has only low-frequency content, then the first terms of the right side of both equations [9] are approximately the same:

$$a_b{}^t(t) \cdot R_{rb}(t) \cdot R_{\Delta\theta} \approx a_b{}^t(t-T_s) \cdot R_{rb}(t-T_s) \qquad [10]$$

Subtracting both equations [9] then results in:

$$a_1(t)-a_2(t)=a_b{}^t(t) \cdot R_{rb}(t) \cdot R_{\Delta\theta}-a_b{}^t(t-T_s) \cdot R_{rb}(t-T_s)+\bar{b} \cdot R_{\Delta\theta}+\bar{n} \cdot R_{\Delta\theta}-\bar{b}-\bar{n}$$

$$a_1(t)-a_2(t) \approx \bar{b} \cdot R_{\Delta\theta}+\bar{n} \cdot R_{\Delta\theta}-\bar{b}-\bar{n}$$

$$a_1(t)-a_2(t) \approx \bar{b} \cdot (R_{\Delta\theta}-I)+\bar{n} \cdot (R_{\Delta\theta}-I) \qquad [11]$$

The difference signal m(t) at the left hand side of the equation is provided by subtraction unit 366.

If the noise on the measurements is small enough, the bias can be approximated:

$$\bar{b} \approx (a_1(t)-(a_2(t)) \cdot (R_{\Delta\theta}-I)^{-1} \qquad [12]$$

This calculation is carried out by inverse calculation module 370. This inverse calculation module comprises a subtraction unit 375 for determining the difference matrix $M=(R_{\Delta\theta}-I)$, matrix inversion unit 371 for determining the inverse $M^{-1}$ of the matrix M, and matrix multiplication unit 372 to determine the bias vector b.

The "single sensor" concept has been simulated. to verify the expected principle. A low-frequent body acceleration is generated. This acceleration contained a sinusoidal component, a band-pass limited random component and a DC-component on both the x- and y-axis of the acceleration. A mechanical rotation of the inertial measurement unit IMU with a rotation frequency above the frequency band of the acceleration signal was simulated. The IMU further contained a bias component to be estimated and sensor noise with a density that is achievable for low-cost MEMS accelerometers (100 µg/√Hz).

Figure 9A:
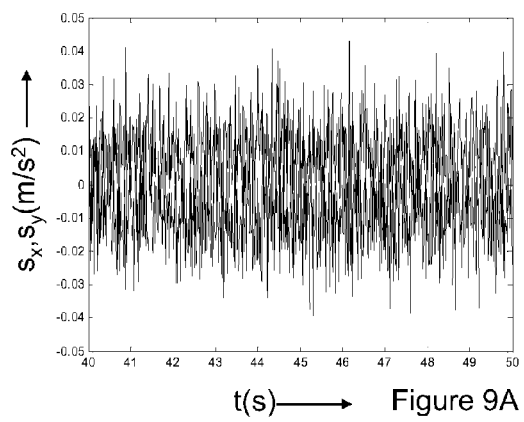
FIG. 9A shows a simulated sensor signal in the absence of an external stimulus.
Figure 9B:
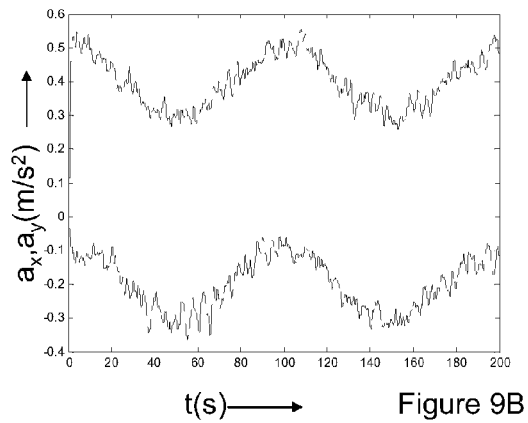
FIG. 9B shows a simulated acceleration.

A time plot of the sensor signals $s_x$, $s_y$ (x- and y-values), without the applied acceleration, are given in FIG. 9A. As can be seen from the figure, the sensor signal contains a bias of +/−0.01 m/s² (corresponding to +/−1 mg) and wideband noise. A time plot of the applied body acceleration $a_x$, $a_y$ is given in FIG. 9B. The acceleration contains some sinusoidal component, a DC-component and a low frequent random component.

Figure 9C:
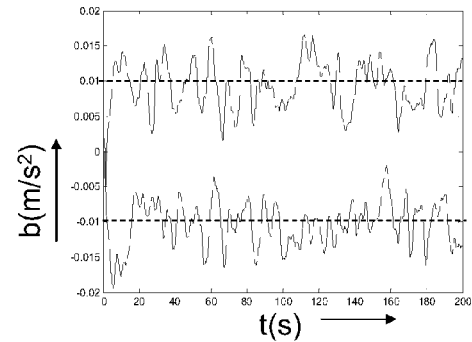
FIG. 9C shows results of an estimation of the bias of the simulated sensor.

A time plot of the estimated biases is given in FIG. 9C.

From the simulations it appears that sensor noise has only a modest effect on the results. The Bandwidth of the input acceleration does have an influence however. It is expected that the bias estimation is optimal if the bandwidth of the input acceleration is low compared to the mechanical rotation frequency.

It should be noted that there is no need for the sensor to rotate with respect to the body, e.g. a vehicle. It is sufficient if the body, including the fixed sensor, is rotating. Since the mechanical rotation of the body including sensor is measured by the gyros, the biases may be estimated during periods in time were the body is undergoing relative high frequency rotations in combination with relative low-frequency accelerations. Applications may for instance be in guided munitions.

Figure 10:
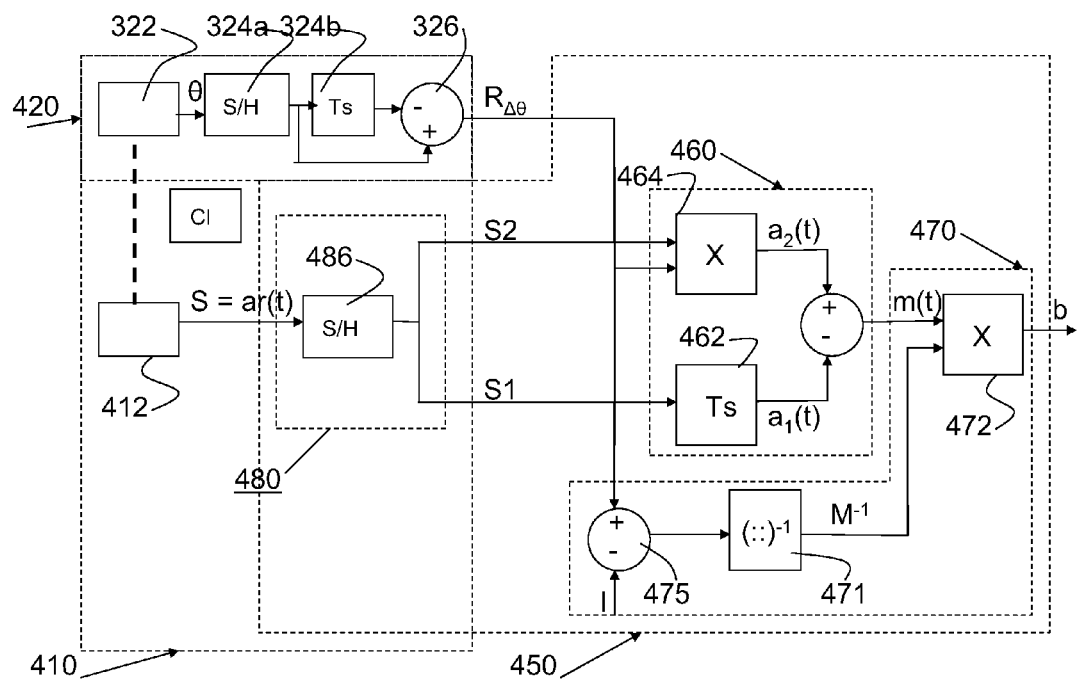
FIG. 10 shows in more detail a fifth embodiment of a navigation device according to the invention.

FIG. 10 shows another embodiment. In FIG. 10, parts corresponding to those in FIG. 7 have a reference number that is 100 higher. As in the embodiment of FIG. 7, samples from a signal $a_r(t)$ obtained with a single sensor 412 are used to estimate a sensor bias and/or an acceleration signal compensated for bias. Contrary to the previous embodiment however, each sample is simultaneously assigned as a sample of the second acceleration measurement vector signal S2, and as a sample of the first acceleration measurement vector signal S1. Now the difference signal generating module 460 determines a difference m(t) between a version of the signal S1 delayed by delay element 462 and a non-delayed version of the signals S2, where the signals are corrected for rotation occurring during the delay time by rotation correction element 464. This embodiment has the advantage that more efficient use is made of the signal S to determine the bias b. The signal S sampled by sample and hold element 486 is provided as the signals S1, S2 to the difference signal generation module 460. The signals are sampled synchronously with a clock C1.

Figure 11:
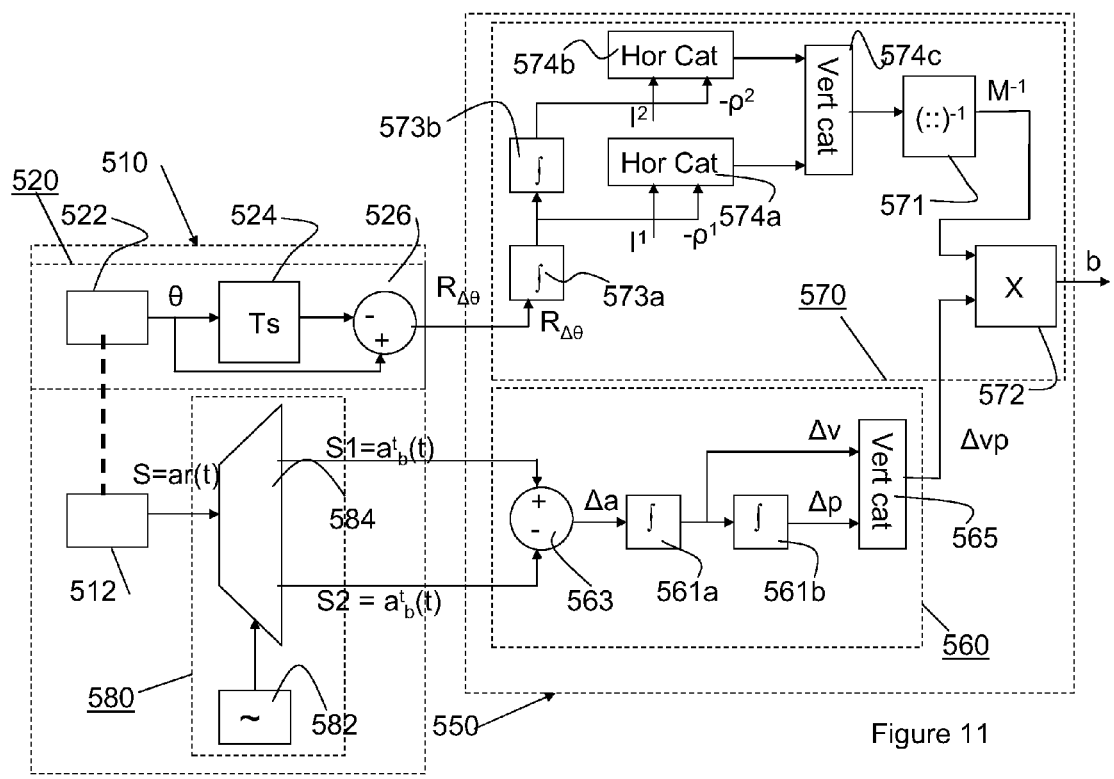
FIG. 11 shows in more detail a sixth embodiment of a navigation device according to the invention.

FIG. 11 shows another embodiment of a navigation system comprising a single sensor. Parts of the inertial sensor unit 510 and the orientation signal generation unit 520 in this Figure corresponding to those of FIGS. 5 and 7 have a reference number that is 400 or 200 higher. Parts of the signal processing module 550 in FIG. 11 corresponding to those of FIG. 6 have a reference number that is 300 higher. In this embodiment two signals S1, S2 are derived from the same acceleration sensor 512. The second signal S2 is delayed relative to the first signal S1 by one clock cycle. The signal processing circuit 550 processes these signals S1, S2 in the same way as it processes the signals S1, S2 obtained from different acceleration sensors 212, 214, as is the case in the embodiment of FIG. 6. This will result in two estimations b1, b2 for the acceleration sensor bias. An average value of these two estimations may be used as the estimation b for the bias of the sensor 512. In order that the equations solved by signal processing module 550 are sufficiently independent, it is necessary that the sensor 512 is sufficiently rotated during the measurements. This can be realized in that the navigation system as a whole is rotated during use, e.g. caused by movements of a vehicle, or that a separate actuator rotates the sensor 512.

Figure 12:
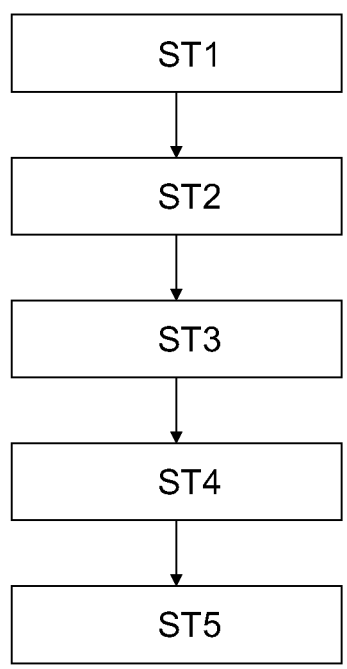
FIG. 12 shows a method according to the invention.

FIG. 12 illustrates a method for providing navigation data. In a first step ST1 a first and a second acceleration measurement vector signal S1, S2 that respectively comprise a first and a second sequence of vector signal samples are provided. The vector signal samples comprise at least a first and a second linearly independent acceleration measurement signal component.

In a second step ST2 an angle of rotation signal $R_{\Delta\theta}$ is provided. This signal is indicative for a difference in orientation at which the sample of the first sequence and the corresponding sample of the second sequence were obtained.

In a third step ST3 at least one difference signal m(t) is generated from the first and the second acceleration measurement vector signal S1, S2.

In a fourth step ST4, inverted matrix data is provided by inverting a matrix derived from the angle of rotation signal.

In a fifth step ST5 a bias signal b1, b2 and/or an object state signal corrected for bias is estimated from the at least one difference signal and the inverted matrix data. It is not important in which order steps ST3 and ST4 are carried out.

Figure 13:
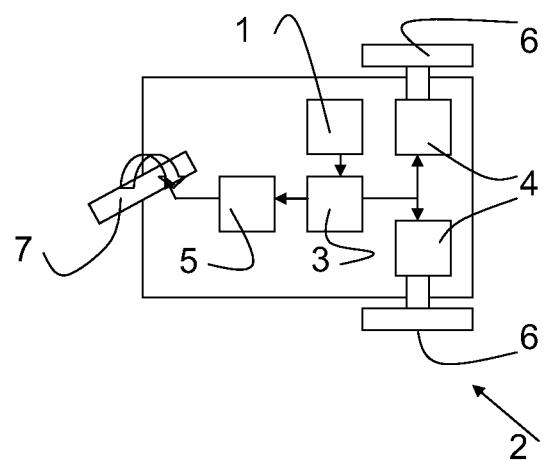
FIG. 13 shows a vehicle provided with a navigation device according to the invention.

FIG. 13 shows a possible application of a navigation device according to the invention in a vehicle 2. The vehicle 2 comprises a navigation device 1 according to one of the previous claims, as well as a drive mechanism 4 and steering mechanism 5 controlled by the navigation device 1, via a control unit 3. The control unit 3 uses navigation information retrieved from the navigation device 1 to control a driving speed with which the drive mechanism 4 drives back-wheels 6 and to control an orientation imposed by the steering mechanism 5 on the front wheel 7.

In the claims the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The invention claimed is:

1. A signal processing module comprising
a difference signal generating module for generating at least one difference signal from a first and a second acceleration measurement vector signal wherein the first and the second acceleration measurement vector signal respectively comprise a first and a second sequence of vector signal samples, the vector signal samples comprising at least a first and a second linearly independent acceleration measurement signal component, wherein samples in the first sequence have a corresponding sample in the second sequence, wherein the vector signal samples of at least one of the first and the second acceleration measurement vector signal represents a measurement result of a single acceleration sensor having a variable orientation as a function of time or of a respective one of first and a second acceleration sensor of which at least one has a variable orientation as a function of time,
an orientation signal generation unit for providing at least one angle of rotation signal that is indicative for a difference in orientation at which a sample of the first sequence and a corresponding sample of the second sequence were obtained, and
an inverse calculation module comprising
a matrix inversion facility for providing inverted matrix data by inverting a matrix derived from the at least one angle of rotation signal, and
a matrix multiplication facility for estimating from the at least one difference signal and the inverted matrix data a bias signal and/or an object state signal corrected for bias,
wherein the difference signal generating module comprises integration facilities and subtraction facilities, the difference signal generating module being arranged for determining at least a difference between an $n^{th}$ order integrand of the first and the second acceleration measurement vector signal and a difference between an $m^{th}$ order integrand of the first and the second acceleration measurement vector signal wherein m and n are mutually different integers greater or equal than 0, and wherein the inverse calculation module comprises matrix integration facilities that derive the matrix from the angle of rotation signal.

2. A navigation device comprising
a signal processing module according to claim 1, and
an inertial sensor unit for providing the first and the second acceleration measurement vector signal.

3. A vehicle comprising a navigation device according to claim 2, the vehicle comprising a drive and steering mechanism controlled by the navigation device.

4. A vehicle according to claim 3, comprising a further navigation facility for providing information relating to a state of the vehicle, the state comprising at least one of a position, a velocity and an acceleration and an orientation of the vehicle, and comprising a combination facility for combining the object-state signal of the navigation device with the information provided by the further navigation facility.

5. A navigation device according to claim 2, wherein the inertial sensor unit comprises
a first and a second inertial sensor that provide the first and the second acceleration measurement vector signal respectively, as well as
a rotation facility that causes a relative rotation between the first and the second inertial sensor.

6. A navigation device according to claim 5, wherein m=1 and n=2.

7. A vehicle comprising a navigation device according to claim 6, the vehicle comprising a drive and steering mechanism controlled by the navigation device.

8. A vehicle according to claim 7, comprising a further navigation facility for providing information relating to a state of the vehicle, the state comprising at least one of a position, a velocity and an acceleration and an orientation of the vehicle, and comprising a combination facility for combining the object-state signal of the navigation device with the information provided by the further navigation facility.

9. A vehicle comprising a navigation device according to claim 5, the vehicle comprising a drive and steering mechanism controlled by the navigation device.

10. A vehicle according to claim 9, comprising a further navigation facility for providing information relating to a state of the vehicle, the state comprising at least one of a position, a velocity and an acceleration and an orientation of the vehicle, and comprising a combination facility for combining the object-state signal of the navigation device with the information provided by the further navigation facility.

11. A signal processing module according to claim 1, further comprising a signal splitting facility for generating the first and the second acceleration measurement vector signal from a single acceleration measurement signal, wherein the difference signal generating module comprises a delay facility for delaying the samples of the first acceleration measurement signal for synchronization with corresponding samples of the second acceleration measurement signal and comprises a rotation compensation facility for compensating for a difference in orientation of the acceleration sensor between the moment of sampling a sample for the first acceleration measurement signal vector and the moment of sampling a corresponding second sample for the second acceleration measurement signal vector, the compensation facility being controlled by the angle of rotation signal.

12. A signal processing module according to claim 11, wherein the signal splitting facility is a de-multiplexing facility that derives the first and the second acceleration measurement vector signals by alternately assigning a sample of the single acceleration measurement vector signal as a sample of the first and as a sample of the second acceleration measurement vector signal.

13. A signal processing module according to claim 11, wherein the signal splitting facility assigns samples for the first and the second acceleration measurement vector signals by simultaneously assigning a sample of the single acceleration measurement vector signal as a sample of the first and as a sample of the second acceleration measurement vector signal.

14. A navigation device comprising a signal processing module according to claim 13 and an inertial sensor unit with an acceleration sensor for generating the single acceleration measurement vector signal.

15. A vehicle comprising a navigation device according to claim 14, the vehicle comprising a drive and steering mechanism controlled by the navigation device.

16. A vehicle according to claim 15, comprising a further navigation facility for providing information relating to a state of the vehicle, the state comprising at least one of a position, a velocity and an acceleration and an orientation of the vehicle, and comprising a combination facility for combining the object-state signal of the navigation device with the information provided by the further navigation facility.

17. A navigation device comprising a signal processing module according to claim 11 and an inertial sensor unit with an acceleration sensor for generating the single acceleration measurement vector signal.

18. A vehicle comprising a navigation device according to claim 17, the vehicle comprising a drive and steering mechanism controlled by the navigation device.

19. A vehicle according to claim 18, comprising a further navigation facility for providing information relating to a state of the vehicle, the state comprising at least one of a position, a velocity and an acceleration and an orientation of the vehicle, and comprising a combination facility for combining the object-state signal of the navigation device with the information provided by the further navigation facility.

20. Method for providing navigation data comprising the steps of providing a first and a second acceleration measurement vector signal, the first acceleration measurement vector signal including a sequence of first vector signal samples and the second acceleration measurement vector signal including a sequence of second vector signal samples, the vector signal samples comprising at least a first and a second linearly independent acceleration measurement signal component, wherein samples in the first sequence have a corresponding sample in the second sequence, wherein the vector signal samples of at least one of the first and the second acceleration measurement vector signal represents a measurement result of a single acceleration sensor having a variable orientation as a function of time or of a respective one of first and a second acceleration sensor of which at least one has a variable orientation as a function of time, providing at least one angle of rotation signal, that is indicative for a difference in orientation at which a sample of the first sequence and a corresponding sample of the second sequence were obtained, generating at least one difference signal from the first and the second acceleration measurement vector signal, comprising determining at least a difference between an nth order integrand of the first and the second acceleration measurement vector signal and a difference between an mth order integrand of the first and the second acceleration measurement vector signal wherein m and n are mutually different integers greater or equal than 0, providing inverted matrix data by inverting a matrix derived from the at least one angle of rotation signal and estimating from the at least one difference signal and the inverted matrix data a bias signal and/or an object state signal corrected for bias.

\* \* \* \* \*